United States Statutory Invention Registration [19]

[11] Reg. Number: H287

Montjoye [43] Published: Jun. 2, 1987

[54] AIR LAUNCHED CRUISE MISSILE (ALCM) RESTRAINT ASSEMBLY

[75] Inventor: W. David Montjoye, Beavercreek, Ohio

[73] Assignee: The United States of America as represented by the Secretary of the Air Force, Washington, D.C.

[21] Appl. No.: 927,020

[22] Filed: Nov. 5, 1986

[51] Int. Cl.[4] ..... B61D 3/16

[52] U.S. Cl. ..... 410/2; 410/47;81

*Primary Examiner*—Harold J. Tudor

*Attorney, Agent, or Firm*—Fredric L. Sinder; Donald J. Singer

[57] ABSTRACT

A ground transporter for air launched missiles. The transporter is constructed by bolting two pairs of "H" beams across a flat-bed trailer. The bolts are applied through holes in the bottom flanges of the "H" beams. A pair of missile handling units are then bolted to each pair of "H" beams. The missile handling units are bolted at each of their ends to the top flanges of the "H" beams. Steel bushings add structural support to the bolt holes through the wooden beams of the trailer bed and hillside washers are used on the bolts through the "H" beams and the side "C" channel rails of the trailer bed.

16 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR LAUNCHED CRUISE MISSILE (ALCM) RESTRAINT ASSEMBLY

RIGHTS OF THE GOVERNMENT

The invention described herein may be manufactured and used by or for the Government of the United States for all governmental purposes without the payment of any royalty.

BACKGROUND OF THE INVENTION

The present invention relates generally to transporting equipment and more specifically to missile transporters.

Transporting air launched missiles from storage to maintenance areas and across runways to attach to aircraft requires transporters that are extremely stable and secure, especially for transporting air launched missiles containing nuclear warheads. Existing missile transporters are adequate for transporting conventional air launched non-nuclear missiles. but are not stable or secure enough to meet nuclear safety requirements. The proposed costs for developing new air launched missile transporters are extremely high. It is seen that there is a need for a safe and inexpensive transporter for air launched nuclear missiles.

It is, therefore, a principal object of the present invention to provide a safe and inexpensive transporter for air launched nuclear missiles.

A feature of the present invention is that it uses commonly available parts to make a modification kit for converting a standard 40 foot flat-bed trailer to an air launched nuclear missile transporter.

An advantage of the the present invention is that the modification kit may be easily modified to carry different missiles and may be removed to allow the trailer to be used for other tasks.

SUMMARY OF THE INVENTION

The present invention provides a modification kit for converting a standard 40 foot flat-bed trailer to an air launched cruise missile (ALCM) transporter. The unique discovery of the present invention is that the use of carefully selected commonly available parts will solve the problem of providing extremely stable and secure transportation for nuclear missiles without the excessive expense of other more complex solutions.

Accordingly, the present invention is directed to an apparatus and method for carrying missiles on a flat-bed trailer comprising first and second "H" beams attached to the trailer bed at their bottom flanges and having a missile handling unit attached to the "H" beams at their upper flanges. The missile handling unit is preferably attached at a first end to the first "H" beam and at a second end to the second "H" beam.

The "H" beams may be attached to the trailer bed by nuts and bolts extending through holes in the "H" beam bottom flanges and the trailer bed. The holes through the trailer bed may be reinforced by bushings through the holes. The attachment of the "H" beams to the trailer bed may be additionally reinforced by the use of bearing plates surrounding the bolts between the bottom nut and the trailer bed. The attachment of the "H" beams along the side "C" channel trailer rails may be by hillside washers surrounding a bolt between its nut and the trailer bed.

The attachment of the missile handling unit to the "H" beam may be by similar nuts and bolts extending through the "H" beam top flanges.

The individual "H" beams may additionally include lifting handles to aid their installation and removal.

DESCRIPTION OF THE DRAWINGS

The present invention will be more clearly understood from a reading of the following detailed description in conjunction with the accompanying drawings wherein.

DETAILED DESCRIPTION

Figure 1:
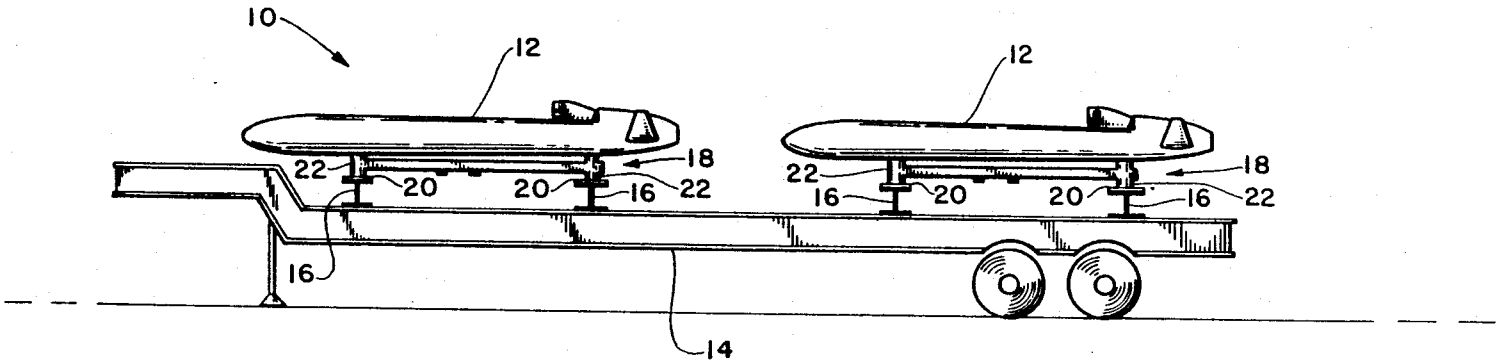
FIG. 1 is a side view of a missile transporter showing the attachment of air launched cruise missiles to a flat-bed trailer by the use of "H" beams mounted on the trailer.

Referring now to FIG. 1 of the drawings, there is shown a side view of a missile transporter 10 illustrating the attachment of air launched cruise missiles 12 to a flat-bed trailer 14 by the use of "H" beams 16 mounted on flat-bed trailer 14. Trailer 14 is a familiar 40 foot flat-bed trailer with a primarily wood beam bed. The wood beams 24 (shown in FIG. 2) run the length of trailer 14 supported between two outside steel "C" channels 26 and interleaving steel "I" beams 27. The "C" channels 26 and "I" beams 27 also serve as part of the trailer bed surface. In this particular embodiment, a trailer 14 having military specification NSN 2330-0-0-125-3892 is used. Any 2330 class trailer can be used.

"H" beams 16 are mounted in pairs across the trailer 14 surface to allow attachment of two missiles 12 to each pair of "H" beams 16. Conventional missile handling units 18 (MHU's), to which missiles 16 attach, are firmly bolted to the top flanges of "H" beams 16. Each MHU 18 comprises three primary components, a pair of MHU-162 supports 20 bolted to "H" beams 16 and an MHU-159 missile holder 22.

Figure 2:
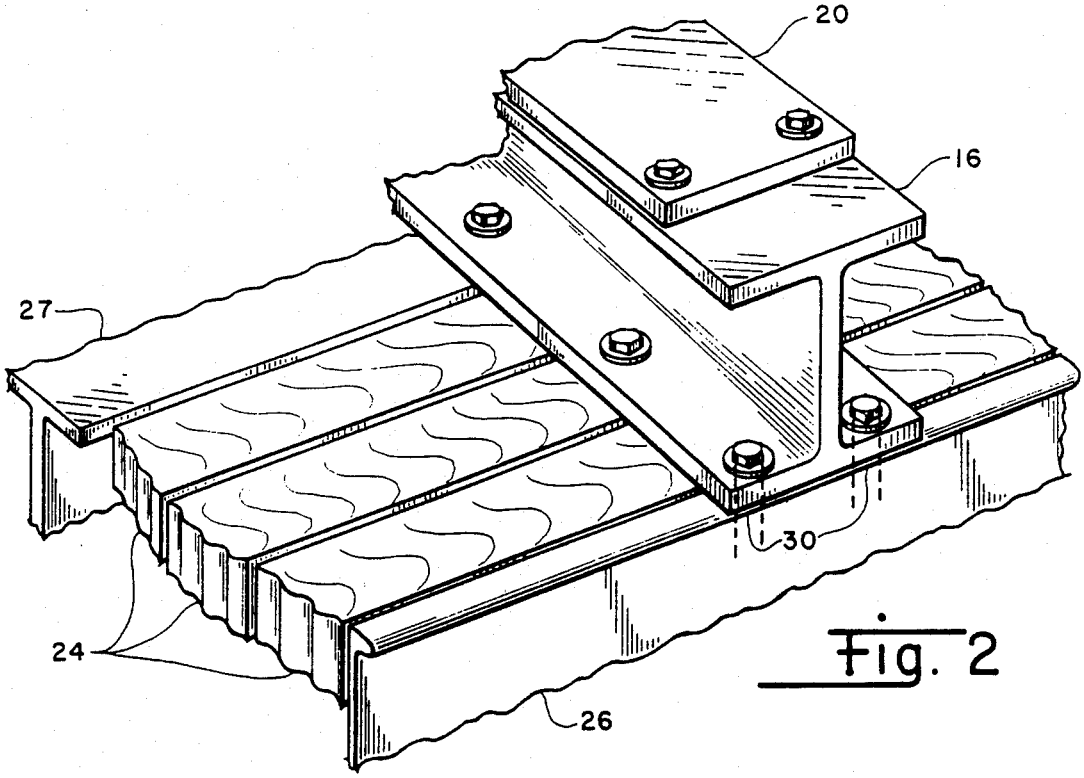
FIG. 2 is a perspective view showing details of attachment of one end of an "H" beam to the wood beams, side "C" channel and central I beams of the trailer bed.

The perspective view of FIG. 2 shows several details of the attachment of the bottom flange of one end of "H" beam 16 to the wood beams 24 and side "C" channel 26 of the trailer bed. An MHU-162 support 20 is shown in partial view mounted by bolts to "H" beam 16.

Figure 3:
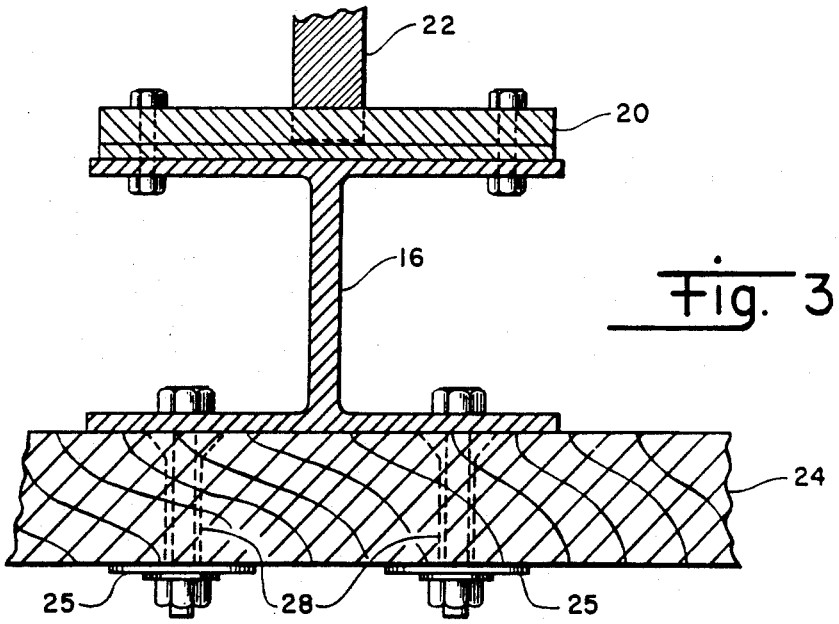
FIG. 3 is a side cross-sectional partial view of the attachment of one end of an "H" beam to the wood beams of the trailer showing the use of bolt bushings.

The side cross-sectional view of FIG. 3 shows the attachment of one end of an "H" beam 16 to the wood beams 24 of the trailer 14 utilizing steel bushings 28 to provide additional structural support for the bolting of "H" beam 16 to wood beams 24. Steel bearing plates 25 spread bolt stresses across a wider surface of wood beams 24. Where a trailer with an all steel bed is used, the use of bushings and bearing plates may not be necessary.

Figure 4:
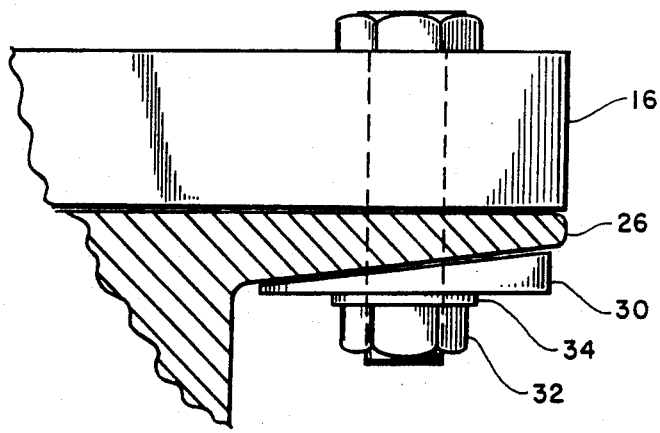
FIG. 4 is a front cross-sectional partial view of the attachment of one end of an "H" beam to a side "C" channel of the trailer bed; and, FIG. 5 is a perspective view of an "H" beam showing a lift handle used to aid installing and removing the "H" beam and a general bolt hole pattern.

FIG. 4, showing a partial cross-sectional view of the bolting of one end of an "H" beam 16 to a side "C"

channel 26 of the trailer bed, illustrates the use of a hillside washer 30 to provide a horizontal clamping surface for a bolt nut 32 and washer 34.

Figure 5:
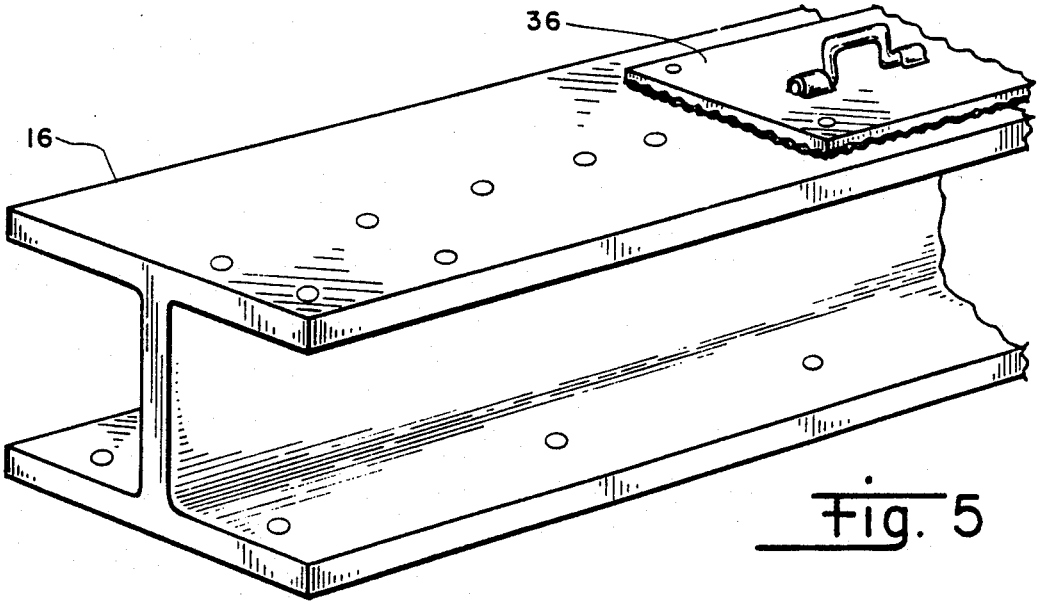

A lift handle 36, as shown in FIG. 5, aids installing and removing the "H" beam.

The disclosed missile transporter successfully demonstrates the low cost use of standard "off-the-shelf" parts adapted to accomplish a specialized task.

It is understood that certain modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. An apparatus for carrying missiles on a flat-bed trailer, comprising:

(a) first and second "H" beams having a pair of top flanges and a pair of bottom flanges;

(b) means for attaching the bottom flanges of the first and second "H" beams to the trailer bed;

(c) at least one missile handling unit having first and second ends; and, (d) means for attaching the missile handling unit to the top flanges of the first and second "H" beams.

2. The apparatus according to claim 1, wherein the means for attaching the missile handling unit to the top flanges of the first and second "H" beams includes attachment of the first end of the missile handling unit to the top flanges of the first "H" beam and the second end of the missile handling unit to the top flanges of the second "H" beam.

3. The apparatus according to claim 2, wherein the means for attaching the first and second "H" beams to the trailer bed comprise a plurality of cooperating bolts, nuts and means defining holes through the bottom flanges and the trailer bed.

4. The apparatus according to claim 3, wherein the means defining holes through the trailer bed include bushings extending through the trailer bed.

5. The apparatus according to claim 3, further comprising at least one bearing plate surrounding at least one bolt between it cooperating nut and the trailer bed.

6. The apparatus according to claim 3, further comprising at least one hillside washer surrounding at least one bolt between its cooperating nut and the trailer bed.

7. The apparatus according to claim 2, wherein the means for attaching the missile handling units to the first and second "H" beams comprise a plurality of cooperating bolts. nuts and means defining holes through the missile handling units and rhe top flanges.

8. The apparatus according to claim 2 wherein the "H" beams include lifting handles.

9. A missile transporter, comprising:

(a) a flat-bed trailer:

(b) first and second "H" beams having a pair of top flanges and a pair of bottom flanges;

(c) means for attaching the bottom flanges of the first and second "H" beams to the trailer bed;

(d) at least one missile handling unit having first and second ends; and, (e) means for attaching the first end of the missile handling unit to the top flanges of the first "H" beam and the second end of the missile handling unit to the top flanges of the second "H" beam.

10. The apparatus according to claim 9, wherein the means for attaching the first and second "H" beams to the trailer bed comprise a plurality of cooperating bolts, nuts and means defining holes through the bottom flanges and the trailer bed.

11. The apparatus according to claim 10, wherein the means defining holes through the trailer bed include bushings extending through the trailer bed.

12. The apparatus according to claim 11, further comprising at least one bearing plate surrounding at least one bolt between it cooperating nut and the trailer bed.

13. The apparatus according to claim 11, further comprising at least one hillside washer surrounding at least one bolt between its cooperating nut and the trailer bed.

14. The apparatus according to claim 10, wherein the means for attaching the missile handling units to the first and second "H" beams comprise a plurality of cooperating bolts, nuts and means defining holes through the missile handling units and the top flanges.

15. The apparatus according to claim 10, wherein the "H" beams include lifting handles.

16. A method of transporting air launched missiles on the ground, comprising:

(a) providing a flat-bed trailer;

(b) attaching first and second "H" beams across the trailer bed, each "H" beam having a pair of top flanges and a pair of bottom flanges;

(c) attaching a first end of a missile handling unit to the first "H" beam and a second end of the missile handling unit to the second "H" beam; and, (d) mounting an air launched missile on the missile handling unit.

* * * * *